United States Patent
Av et al.

(10) Patent No.: US 12,346,217 B2
(45) Date of Patent: Jul. 1, 2025

(54) CONFLICT RESOLVER FOR PRIORITIZING IDENTICALLY TAGGED DATA ASSETS FOR BACKUP USING DATA CHANGE METRICS

(71) Applicant: Dell Products L.P., Round Rock, TX (US)

(72) Inventors: Mahesh Reddy Av, Bangalore (IN); Avinash Kumar, Patna (IN); Terry O'Callaghan, Hopkinton, MA (US)

(73) Assignee: Dell Products L.P., Round Rock, TX (US)

( * ) Notice: Subject to any disclaimer, the term of this patent is extended or adjusted under 35 U.S.C. 154(b) by 51 days.

(21) Appl. No.: 18/353,099

(22) Filed: Jul. 16, 2023

(65) Prior Publication Data
US 2025/0021444 A1    Jan. 16, 2025

(51) Int. Cl.
*G06F 11/00* (2006.01)
*G06F 11/14* (2006.01)

(52) U.S. Cl.
CPC ...... *G06F 11/1461* (2013.01); *G06F 11/1453* (2013.01)

(58) Field of Classification Search
CPC ............. G06F 11/1446; G06F 11/1458; G06F 11/1461
See application file for complete search history.

(56) References Cited

U.S. PATENT DOCUMENTS

| | | | |
|---|---|---|---|
| 2014/0052694 A1* | 2/2014 | Dasari | G06F 3/0619 707/654 |
| 2016/0019119 A1* | 1/2016 | Gupta | G06F 11/1461 707/654 |
| 2016/0335283 A1* | 11/2016 | Rabinovich | G06F 11/1448 |
| 2020/0004640 A1* | 1/2020 | Singhal | G06F 11/1438 |
| 2020/0174892 A1* | 6/2020 | Muehge | G06F 3/0659 |
| 2020/0364113 A1* | 11/2020 | Tormasov | G06F 11/1466 |
| 2021/0117280 A1* | 4/2021 | Tang | G06F 11/1469 |
| 2022/0382780 A1* | 12/2022 | Kumar | G06N 20/00 |
| 2024/0248812 A1* | 7/2024 | Minarik | G06F 16/285 |

* cited by examiner

*Primary Examiner* — Marc Duncan
(74) *Attorney, Agent, or Firm* — Staniford Tomita LLP

(57) ABSTRACT

A conflict resolution component uses data change measure to resolve conflicts when data assets with the same priority tags arrive simultaneously for protection processing. The data change measure quantifies the extent of modifications or updates made to the asset since a last backup. Assets with a higher data change measure are assigned a higher priority and processed ahead of others with the same priority tag. This reprioritization ensures that backup objects with more significant data changes are handled first. Such a system overcomes the issues associated with present methods backup queueing methods including random scheduling of data having the same priority tags or classifications.

19 Claims, 5 Drawing Sheets

---

600

Receive VM assets for data protection processing all with identical tags
602

Determine Data Change Rate for VMs based on appropriate attributes
604

Record arrival time of each VM to use as an additional factor, if needed
606

Resolve conflicts among VMs by re-prioritizing VM order based on data change rates and the aging factor
608

Schedule or Re-schedule VMs in the workflow queue based on score or order based on conflict resolution factors
610

CLIENTS
224

STORAGE
SYSTEM
206

NETWORK
210

Metadata

Backup Data

BACKUP
SERVER
202

BACKUP
SCHEDULER
PROCESS
- Conflict/Ambiguity
Resolver
220

BACKUP
MANAGEMENT
PROCESS
212

DATA CLASSIFIER AND TAGGER COMPONENT 301

| DATA RECEIVER 302 | CLASSIFIER 304 | TAGGER 306 |

MODEL 308

TAGGED ASSET 310

FIG. 3

Identically Tagged Assets 410

400

CONFLICT RESOLVER 401

DATA RECEIVER 402

DATA CHANGE RATE ESTIMATOR 404

COMPARATOR 406

SECOND CLASSIFIER 407

SCHEDULER 409

MODEL 408

BACKUP QUEUE 412

FIG. 4

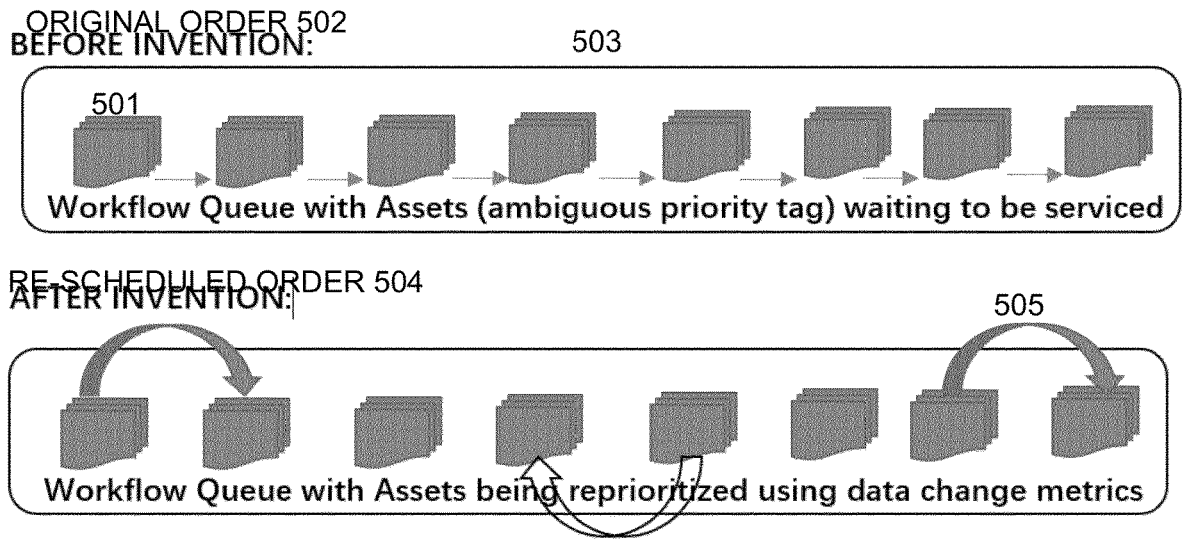

FIG. 5

600 — Receive VM assets for data protection processing all with identical tags
602

Determine Data Change Rate for VMs based on appropriate attributes
604

Record arrival time of each VM to use as an additional factor, if needed
606

Resolve conflicts among VMs by re-prioritizing VM order based on data change rates and the aging factor
608

Schedule or Re-schedule VMs in the workflow queue based on score or order based on conflict resolution factors
610

FIG. 6 though the described embodiments may be practiced without some or all of these specific details. For the purpose of clarity, technical material that is known in the technical fields related to the embodiments has not been described in detail so that the described embodiments are not unnecessarily obscured.

CONFLICT RESOLVER FOR PRIORITIZING IDENTICALLY TAGGED DATA ASSETS FOR BACKUP USING DATA CHANGE METRICS

TECHNICAL FIELD

Embodiments are generally directed to large-scale backup systems and more specifically to resolving priority conflicts in backup job schedules using data change rates of backup assets.

BACKGROUND

Data protection involves backing up data for storage and restoration in case of system failure. Data can be copied from a data source (backup client) to a storage target through a backup server and then replicated (copied back) from the target to the storage for restoration. With ever increasing amounts of data and the need for scalability in enterprise level data systems, the data to be backed up and restored can vary widely with regards to backup requirements and preferences.

Data is often classified and tagged with respect to criticality or other characteristics to help prioritize the backup and restore operations so that high priority data is backed up or restored before lower priority data. Though the tagging enables classification with low, medium and high (or similar) tags, such prioritization can be still be compromised due to the heterogeneous properties of rapidly growing bodies of data. With millions of files being processed at any instant time, even precise tagging does not always prevent backup decisions from being inaccurate or non-optimal because of processing skew or conflicting scheduling of backup jobs. It is common for conflicts or other ambiguous situations to arise when there are multiple data objects with same priority tags. Because the number of classes used in tagging data for protection is finite and almost negligibly small as compared to the number of data blocks, it is inevitable that conflicts will arise when scheduling backups according to tagged classifications. Present data protection systems generally do not effectively accommodate ambiguity and scheduling conflicts for tagged or prioritized data. Because of this, improper scheduling decisions are usually made by the job schedulers, leading to potential data loss by the users.

What is needed, therefore, is a system and method that uses resolves priority conflicts among tagged data assets, such as by a using data change measure as a parameter to resolve priority ambiguities.

The subject matter discussed in the background section should not be assumed to be prior art merely as a result of its mention in the background section. Similarly, a problem mentioned in the background section or associated with the subject matter of the background section should not be assumed to have been previously recognized in the prior art. The subject matter in the background section merely represents different approaches, which in and of themselves may also be inventions. Data Domain, Data Domain Restorer, and PowerProtect are trademarks of DellEMC Inc.

BRIEF SUMMARY OF EMBODIMENTS

Embodiments are directed to a data protection system that utilizes certain supervised learning classification processes using data change measures to help resolve scheduling conflicts among priority tagged data savesets. Such embodiments overcome the issues associated with present methods including random scheduling of data having the same priority tags or classifications.

In a large-scale data protection system, backup conflicts may arise when data assets with the same priority tags for data criticality arrive simultaneously for backup processing. A conflict resolution component leverages a data change measure of the objects as a conflict resolver. The data change measure quantifies the extent of modifications or updates made to the data asset since the last backup. By comparing the data change measures, the data asset with a higher data change measure is assigned a higher priority and processed ahead of others with the same priority tag. This reprioritization ensures that data assets with more significant data changes are handled first. In this way, the data change measure is utilized to determine the relative priorities of equally tagged critical data assets.

Embodiments are also directed to an intelligent solution to defining and prioritizing data savesets using data change measures that uses certain artificial intelligence (AI) and machine learning (ML) based solutions.

BRIEF DESCRIPTION OF THE DRAWINGS

In the following drawings like reference numerals designate like structural elements. Although the figures depict various examples, the one or more embodiments and implementations described herein are not limited to the examples depicted in the figures.

FIG. 1 illustrates a computer network system that implements one or more embodiments of a scheduler process that uses data change rates to resolve conflicts among identically tagged assets.

FIG. 2 illustrates a backup system with a variety of different backup clients generating data to be protected, under some embodiments.

FIG. 3 is a block diagram of an example data classifier and tagger component 301, under some embodiments.

FIG. 4 is a block diagram of a conflict resolver component using a data change metric for asset prioritization, under some embodiments.

FIG. 5 illustrates the re-scheduling or re-prioritization of assets in a backup queue after conflict resolution, under some embodiments.

FIG. 6 is a flowchart illustrating a method of resolving conflicts among identically tagged assets, under some embodiments.

DETAILED DESCRIPTION

Figure 7:
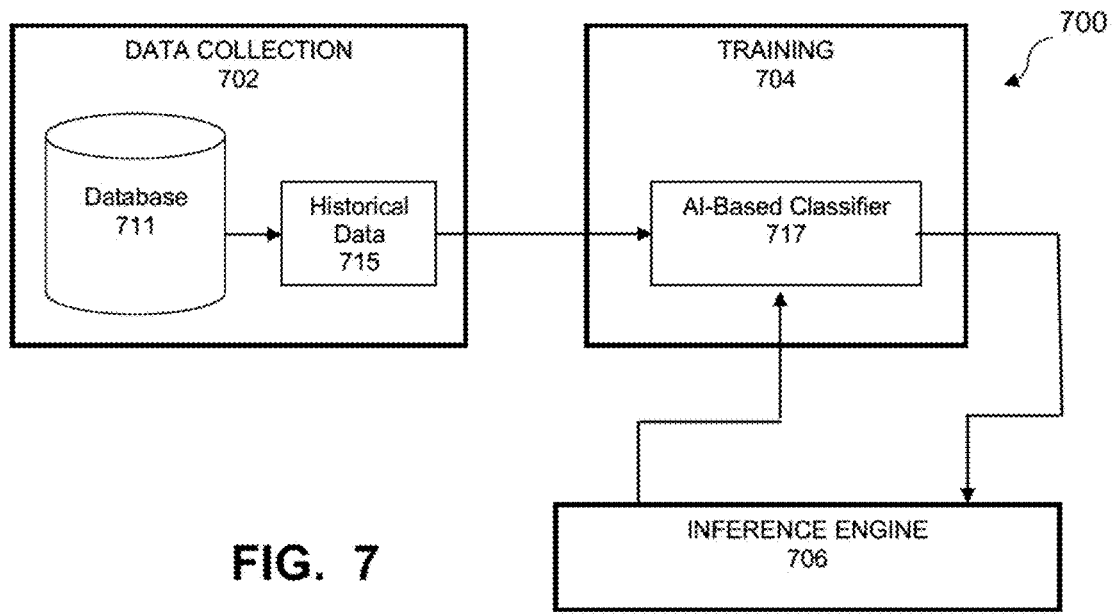
FIG. 7 illustrates a general AI/ML component used in a data protection system using conflict resolution based on data change rates, under some embodiments.

A detailed description of one or more embodiments is provided below along with accompanying figures that illustrate the principles of the described embodiments. While aspects of the invention are described in conjunction with such embodiment(s), it should be understood that it is not limited to any one embodiment. On the contrary, the scope is limited only by the claims and the invention encompasses numerous alternatives, modifications, and equivalents. For the purpose of example, numerous specific details are set forth in the following description in order to provide a thorough understanding of the described embodiments, which may be practiced according to the claims without some or all of these specific details. For the purpose of clarity, technical material that is known in the technical fields related to the embodiments has not been described in detail so that the described embodiments are not unnecessarily obscured.

It should be appreciated that the described embodiments can be implemented in numerous ways, including as a process, an apparatus, a system, a device, a method, or a computer-readable medium such as a computer-readable storage medium containing computer-readable instructions or computer program code, or as a computer program product, comprising a computer-usable medium having a computer-readable program code embodied therein. In the context of this disclosure, a computer-usable medium or computer-readable medium may be any physical medium that can contain or store the program for use by or in connection with the instruction execution system, apparatus or device. For example, the computer-readable storage medium or computer-usable medium may be, but is not limited to, a random access memory (RAM), read-only memory (ROM), or a persistent store, such as a mass storage device, hard drives, CDROM, DVDROM, tape, erasable programmable read-only memory (EPROM or flash memory), or any magnetic, electromagnetic, optical, or electrical means or system, apparatus or device for storing information. Alternatively or additionally, the computer-readable storage medium or computer-usable medium may be any combination of these devices or even paper or another suitable medium upon which the program code is printed, as the program code can be electronically captured, via, for instance, optical scanning of the paper or other medium, then compiled, interpreted, or otherwise processed in a suitable manner, if necessary, and then stored in a computer memory. Applications, software programs or computer-readable instructions may be referred to as components or modules. In this specification, implementations, or any other form that the invention may take, may be referred to as techniques. In general, the order of the steps of disclosed processes may be altered within the scope of the invention.

Some embodiments of the invention certain computer network techniques deployment in a distributed system, such as a very large-scale wide area network (WAN), metropolitan area network (MAN), or cloud based network system, however, those skilled in the art will appreciate that embodiments are not limited thereto, and may include smaller-scale networks, such as LANs (local area networks). Thus, aspects of the one or more embodiments described herein may be implemented on one or more computers executing software instructions, and the computers may be networked in a client-server arrangement or similar distributed computer network.

Data protection systems involve backing up data at regular intervals for restoration, replication, or data move operations based on user need and/or data corruption events. To reduce the sheer amount of data that is backed up and stored, such systems typically use some form of deduplication to eliminate redundant copies of data, such as might be present with data that is frequently backed up, but not as frequently changed in between each backup period.

The Data Domain File System (DDFS) is an example of one such deduplication file system. As the data is ingested, the filesystem anchors and segments the data. The filesystem keeps track of segments which are stored on the disk, and if the segments were to be seen again, the filesystem would just store the reference to the original data segment which was written to disk. Deduplication backups often involve periodic full backups of backup clients by the backup server followed by one or more incremental backups that backup only that data that has changed from a last full backup. Because of the sheer number of backup clients and the amount of data in a large scale data processing system, such backups can be very time and processor intensive.

In order to provide appropriate backup protection to users, data protection vendors often implement certain service level agreements (SLAs) and/or service level objectives (SLOs) to define and quantify certain minimum requirements with regard to backup performance. These parameters usually define characteristics such as maximum backup time per session, minimum data throughput rates, maximum data restore times, data storage terms, and so on. The vendor and/or user is allowed to define policies that control backup operations, such as backup schedules, identity and priority of backup clients and storage targets, backup data types, and so on, and such policies are usually written so that the SLA and SLO requirements are met. However, the dynamic and changing nature of different clients and data types in a backup dataset means that these policies must be similarly adaptable and dynamic to accommodate such changes.

As stated above, most data protection operations involve data assets that are subject to many different types and sources of data that vary in criticality, importance, and sensitivity, thus leading to the need to classify such data in terms of backup/restore priority, and tag the data accordingly. Scheduling conflicts arise however, when multiple data assets are tagged with the same priority. Present systems may simply schedule such assets randomly within a priority class, or invoke a simple round-robin type schedule. This approach however, does not factor other important parameters that may provide good insight into actual priorities among the priority tagged assets. Embodiments include a conflict resolver that uses data change measures among priority or critically tagged data assets to provide intelligent re-scheduling of these assets.

Figure 1:
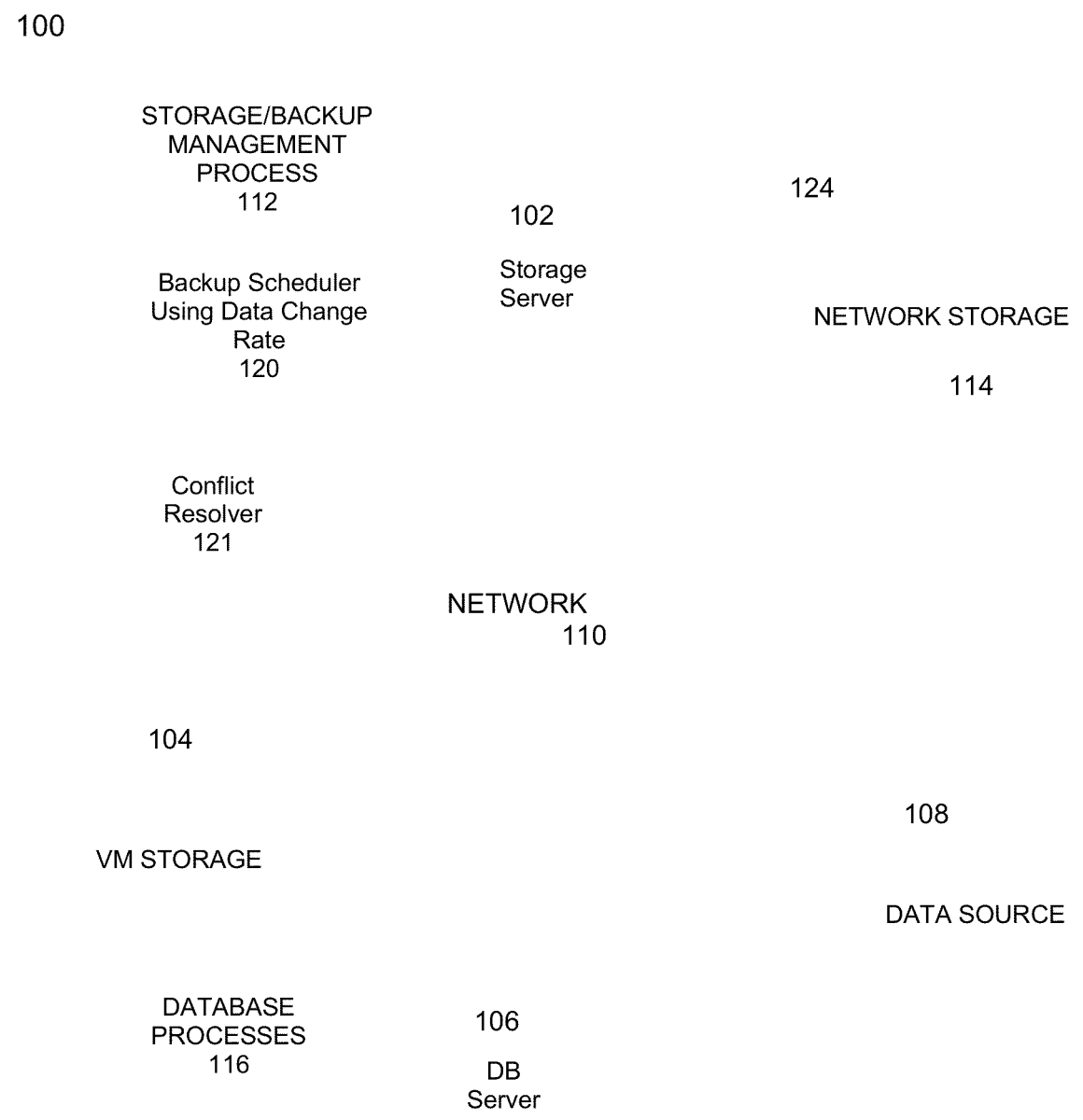

FIG. 1 illustrates a computer network system that implements one or more embodiments of a backup system using data change metrics resolve conflicts in scheduling priority tagged data assets for backup/restore operations. In system 100 of FIG. 1, a storage server 102 executes a data storage or backup management process (or "backup program") 112 that coordinates or manages the backup of data from one or more data sources 108 to storage devices, such as network storage 114, client storage, and/or virtual storage devices 104. With regard to virtual storage 104, any number of virtual machines (VMs) or groups of VMs (e.g., organized into virtual centers) may be provided to serve as backup targets. The VMs or other network storage devices serve as target storage devices for data backed up from one or more data sources, such as storage server 102 or data source 108, in the network environment. The data sourced by the data source may be any appropriate data, such as database data that is part of a database management system, and the data may reside on one or more hard drives for the database(s) in a variety of formats. Thus, a data source may be a database server 106 executing one or more database processes 116, or it may be any other sources data for use by the resources of network 100.

The network server computers are coupled directly or indirectly to the data storage 114, target VMs 104, and the data sources and other resources through network 110, which is typically a cloud network (but may also be a LAN, WAN or other appropriate network). Network 110 provides connectivity to the various systems, components, and resources of system 100, and may be implemented using protocols such as Transmission Control Protocol (TCP) and/or Internet Protocol (IP), well known in the relevant arts. In a cloud computing environment, network 110 represents a network in which applications, servers and data are maintained and provided through a centralized cloud computing platform.

The data generated or sourced by system 100 and transmitted over network 110 may be stored in any number of persistent storage locations and devices. In a backup case, the backup process 112 causes or facilitates the backup of this data to other storage devices of the network, such as network storage 114. In an embodiment network 100 may be implemented to provide support for various storage architectures such as storage area network (SAN), Network-attached Storage (NAS), or Direct-attached Storage (DAS) that make use of large-scale network accessible storage devices 114, such as large capacity disk (optical or magnetic) arrays, such as RAID (redundant array of individual disk) arrays. In an embodiment, system 100 may represent a Data Domain Restorer (DDR)-based deduplication storage system, and storage server 102 may be implemented as a DDR Deduplication Storage server provided by EMC Corporation. However, other similar backup and storage systems are also possible.

As shown in FIG. 1, system 100 includes a backup scheduler process or component 120 for applying appropriate replication operations on data assets using data change rate metrics (measures).

In many a typical large-scale data protection system, there can be many different types of backup clients, each generating different data objects at different times to be included in one or more data assets. FIG. 2 illustrates a backup system like that of FIG. 1, but with a variety of different backup clients 224, ranging from computers, laptops, mobile devices, network devices, servers, and so on, all backing up data and metadata over network 210 through backup server 202 to storage system 206 using a backup program 212. Each client generally represents a device used by a user in a variety of different ways, such as for productivity (e.g., laptop/desktop computers), communications (e.g., mobile phones), applications (e.g., tablet computers), and so on. Other clients may include sensors, IoT (Internet of Things) devices, network interfaces, and other similar devices that generate data. Each client 224 may thus generate different data that may be subject to different protection policies based on data type, importance, volume, storage requirements, and so on. In present systems, defining appropriate backup policies for each data type generally requires manual policy definitions by a user or system administrator.

Embodiments of systems 100 and 200 include respective backup scheduler processes 120 and 220 that dynamically and automatically identify and classify data assets (or data objects or "savesets") on the basis of data criticality or other attributes for prioritization with respect to backup (or restore) operations. Embodiments described below may apply to either component 120 in the basic backup system of FIG. 1, or component 220 in the multi-client backup system of FIG. 2.

The backup schedulers process data assets that have been classified and tagged with respect to their criticality or priority among other data sets processed by the backup server, such as for queuing backup jobs to copy the assets to storage targets.

The data assets may be tagged by any appropriate tagging process. FIG. 3 is a block diagram of an example data classifier and tagger component 301, under some embodiments. As shown in FIG. 3, component 301 includes a data receiver 302 that receives data for backup or other data protection operations. The received asset may be one of several assets from one or more backup clients to be backed up at a specific time or through a specific backup thread. The asset may be characterized as "critical" or "sensitive" data and eligible for prioritized processing relative to other data assets that may be covered under the same backup policy. Thus, this data may be suitable for enhanced or different policies as compared to "normal" data backed up and restored through routine or defined protection policies.

The received critical data objects are classified by a classifier process 304 as either critical or non-critical. The clients generating this data can also be classified as critical along with their data objects. The data that is classified as critical is then appropriately tagged through tagger 306 with certain metadata using a tagging process to signify important criticality parameters, such as data type, protection priority, special handling, and so on to match with appropriate protection policies. Various different parameters can be used to determine the criticality of data objects, such as data type, data source, storage requirements, lifecycle, application, user and so on. Other parameters for both client and data include: critical strings, nature of the application being hosted, number of applications, size, data leg, device ports, data path available, datastore size, provisioning details, and so on. The tagged data asset 310 is then processed through the selected policy, but may first be placed in a backup queue if there are multiple assets to be protected at the same time under the policy.

The classification of an asset as critical or non-critical or high/medium/low criticality, and so on, may be derived from characteristics of the assets and clients themselves on a per transaction basis, or it may be informed by historical and extrinsic information, such as in a supervised learning system. For the embodiment shown in FIG. 3, system 300 makes use of use of historical data from users that train a ML model 308 to decide the classification of the asset through a classifier model 308 that makes use of the all the existing parameters from the historical data from the user environments (or lab) to decide on the proper or closest prioritization of the asset.

The tagger 306 assigns criticality tags to data objects to ensure they are aligned with the appropriate backup protection policy and cycles. In an embodiment, the criticality tags may be binary, such as critical/non-critical, or they may be ranked, such as P0 (highest priority tag), P1, P2, and so on, but any other or similar hierarchical tag may be used. In an embodiment, the tag comprises a key value having a format of "CRITICALITY_TAG" with an associated encoded scalar value (e.g., P0, P1, P2, etc.), wherein the associated value represents a priority value of a critical data object ranked along a defined scale, and wherein the defined scale is on the order of 1 to 5, in one of ascending or descending order of priority. Such scale levels can also be associated with qualitative descriptions, such as Platinum/Gold/Bronze, or High/Medium/Low, etc. to align with corresponding protection policies.

In an embodiment, the classifier may use certain machine learning (ML) algorithms, such as KNN or RNN algorithm to classify the asset based on asset/client attribute information and historical data through model 308. Using this information, a wide range of data is used to classify different assets. For example, a client hosting a security-related application will be given a higher priority tag than a client hosting a gaming application. Similarly, a data object such as a file system under the tagged client will undergo further tagging based on the criticality factor of the file system and its usage.

As mentioned, in an embodiment. The classifier may be a KNN-based classifier. In this case, the KNN (k-nearest neighbors) algorithm is employed as a classification algorithm that is dependent upon the labelled input data to study a function that would produce an output when a new unlabeled data is given as input. It classifies the data point on how its neighbor is classified. The basic principle of this model is to classify any new input data based on the similarity measure of the data points which was stored earlier. For example, consider a dataset of two Virtual Machines (Critical and Non-Critical) as labeled data, both would have a set of attributes like: critical strings, nature of the application being hosted number of applications, size, data leg, device ports, data path available, datastore size, provisioning details and so on. When a new VM is introduced, the KNN model will get trained with similar attributes and will try to match its similarity with these attributes.

These attributes represent only some criticality attributes or parameters (characteristics) and embodiments are not so limited. Any other or additional parameters characterizing the criticality, sensitivity, or specialness of a new data object may be used. Any new introduced data object into the system can be predicted to be classified into a critical or non-critical based on these attributes.

As described above, there may often be instances where multiple assets may be tagged as critical for priority processing by a backup process or thread. In this case, a conflict arises in terms of further prioritizing among these critical assets to determine which is the most critical or more critical as compared to the others. Embodiments of the backup scheduler process 120 uses a conflict resolver component 121 to essentially break the tie in cases of such conflict situations. In an embodiment, the conflict resolver uses the additional attribute of rate of data change (data change rate) of an asset to enhance or downgrade the criticality classification of an asset.

The data change measure quantifies the extent of modifications or updates made to the data asset since the last backup. By comparing the data change measures, the data asset with a higher data change measure is assigned a higher priority and processed ahead of others with the same priority tag. This reprioritization relies on the fact that data assets with more significant data changes are likely to need to be handled first, and are thus re-prioritized accordingly.

The conflict resolver essentially adds another priority classification on top of the critical/non-critical or ranked (P0, P1, P2) classification of classifier 304. That is, if two assets are ranked as critical, the conflict resolver will classify one asset as Highly_Critical and the other as Normal_Critical, or similarly P0_High, P0_Medium, P0_Low, and so on. Similarly, if the two compared assets are both ranked medium criticality or P1, the conflict resolver may classify one as P1_High and the other as P1_Low, and do on. The conflict resolver thus resolves conflicts among assets that come of the classifier with the same criticality tag, regardless of the tag.

In an embodiment, the rate of data change of an asset is measured to drive a metric referred to herein as a "data change measure" or "data change metric." This metric is then used to further prioritize an asset for a particular replication operation. It is thus used as a parameter to resolve conflicts among priority tagged assets being processed by the replication service. It can thus be used to define a Highly_Critical priority asset versus a Normal_Critical priority asset, for example.

In some cases, the rate of data change of an asset may be measured directly, and used to define the data change rate metric with a certain degree of certainty. In other cases, the data change rate may be derived from a supervised learning process that takes into account present and historical system information to make an informed quantification of data change rate of the asset.

FIG. 4 is a block diagram of a conflict resolver component for backup scheduling using a data change metric for asset prioritization, under some embodiments. As shown in FIG. 3, system 300 includes a conflict resolver component 401 that resolves conflicts for assets prioritized for replication operations. In system 400, a number of identically tagged assets 301, such as from the classifier and tagger component 301, is received by a data receiver 402. Any practical number of assets may be received, and represent assets that are to be processed in a same data protection operation, and thus are received simultaneously for processing serially.

The assets are each analyzed by a data change rate estimator component 404 to determine a current rate of change for each asset.

In an embodiment, the data change rate of each asset may be compared with historical data provided by a model 408. For this embodiment, the estimator 404 may be an analytical unit using a bit map that is created for the dataset being processed and which is compared with the bit map from the last incremental/full backup to detect the changes in the bit map of the dataset. For example, if there is a volume c: \ being replicated, a bitmap of the drive is fetched from the current time instant and compare it with historical data i.e., the bitmap from the last successful backup or a tuned time interval from the end user input, whichever is earlier. Also, along with the last bit map, any historical data changes from the present asset would be calculated using the model in place. With this comparison, the analytical unit would determine the data changes and parameter changes (e.g., size of changes, data change rate, etc.). The historical data provided by a model is a micro-unit of the estimator 404 that works as an AI-based analytical model to hold the historic bit map data of the data asset under consideration. When a model 408 is referenced, it is the estimator in conjunction with the model that is holding the historic bit map data.

Any fitting AI algorithm to detect data changes from historic data or bit maps can be used for this embodiment. The estimation here is a quantifiable metric rather than a quality measure, and is done using the bit map of current time and bit map of the last successful backup in regular interval times historically. The analytical unit has an AI model that is trained with historic data to hold a proper bit map data change that could be potentially used as a reference to compare with the current bit map changes. The historical bit map data would inform only the reference for a bit map change comparison from the past data changes in the data unit.

In general, the estimator 404 does the work of data change estimation, and the system 400 makes the backup scheduling decisions using the data change rates estimated. The estimator has an AI model 408 that is trained with historic data to hold a proper bit map data change that could be potentially used as a reference to compare with the current bit map changes. Historical bit map data would inform only the reference for a bit map change comparison from the past data changes in the data unit, and the estimator then takes care of the calculation.

Using the bitmap of the current time and the bitmap of the last successful backup made during regular time intervals, the estimator component 304 calculates a data change rate metric 303 for a respective asset 410, which is a quantifiable value rather than a qualitative characteristic. For a change rate, this metric is expressed as a number of bytes changed per unit time (bytes/time), where the time period may be configured based on system configuration and needs. For example, if the data change rate calculation shows that there was a data change of 100 GB per hour, then the data change rate metric 303 would be 100 GB, regardless of when the last replication occurred. The data change rate can be represented as an absolute value along a range defined by the threshold values, such as in table 400, and any appropriate unit may be used depending on the characteristic that is measures, such as number of bytes per unit time. Alternatively, it may be represented as a percentage of change relative to a baseline value defined by the model 308

As shown in FIG. 4, the estimated or actual data change rate of the asset is then used to further reclassify the asset with respect to the other assets being processed by the data protection operation. The data change rates for each asset are compared in comparator 406, and the asset with the highest data change rate is then given a higher priority than the other assets, such as through an second classifier process 407 that adds this additional factor to the original criticality tag, such as by appending an additional tag or other second or sub-prioritization indicator.

In an embodiment, the re-classifier process 407 does not involve changing the original or existing tags from tagger 306 themselves. Instead, it uses the data change measure alongside the existing tags, such as criticality (critical, high, medium, low), to determine the priority of these tagged objects. The tags can remain the same, and the data change measure is utilized as an additional factor in the decision-making process. This is then used to resolve scheduling conflicts among assets with the same priority tags by considering the extent of data changes to each respective asset.

The amended or reclassified data assets are then processed by a scheduler 409 to define an optimal order of the conflicting assets in backup queue 412.

For the embodiment shown in FIG. 4, system 400 makes use of the data change rate to schedule or re-schedule the order of the data assets in a queue for backup processing. As mentioned above, the data change rate may be provided by a direct measure of the data change rate of the asset may be used, if such a metric is available, or it may use of historical data from a trained model 408. Either way, the assets 410 are further classified to decide the schedule (order) of assets being processed in backup queue 412.

In an embodiment, a scoring process can be used to assign a scheduling score to each asset based on its data change rate. This score can then be modified by any additional factors, such as time it has spent in the queue (aging). The score can be a weighted score, compound score, or any other relative scalar value assigned to the asset after determination of the re-scheduling factors. A final score may be calculated if multiple factors need to be used to prioritize the assets, and this score reflects the relative priority of the asset among all of the identically tagged and simultaneously received assets.

FIG. 5 illustrates the re-scheduling or re-prioritization of assets in a backup queue after conflict resolution, under some embodiments. FIG. 5 illustrates a number of data assets 501 in an original order 502 in a workflow (e.g., backup) queue 503. Each of the assets 501 is classified and tagged with the same criticality tag, such as CRITICAL or P0, or any similar tag. Some of these critical assets, however, may be preferably processed ahead of the other assets. As shown above, the data change rate of each asset is analyzed to reschedule the assets accordingly. As shown in FIG. 5, the original order 502 can be re-scheduled 504 upon re-prioritization 505 of certain assets, as shown. The re-prioritization may be accomplished by moving an asset ahead of one or more other assets, such as move 505, or by moving an asset behind another asset, such as move 507. FIG. 5 is provided for purposes of illustration, and any other rescheduling configuration may also be used.

As shown in FIG. 5, in cases where the assets have been tagged with a criticality label for instance, critical, high, medium and low, and the assets with same label have arrived at the same time for reservation of a stream, or a resource, or a workflow queue slot, then the data change measure can be leveraged as a conflict resolution factor. That is, an asset with higher data change measure can be placed at a higher priority and served ahead of another critically tagged asset. For example, in a workflow queue, if there are several assets with same critical tag, then the ones with higher data change can be put ahead in the front line to serve first.

Although embodiments have been described with respect to data change rate as the factor for further prioritizing tagged assets, other attributes can instead or also be used, such as aging, application, and so on.

In some cases, there may be a continued conflict or "tie" among further tagged assets in system 401. In this case, the conflict resolver system can also be extended to prioritize among more than two classifications, such as Criticality-Data_Change_Rate to Criticality-Data_Change_Rate-Aging, and so on. The aging factor represents the duration that the backup data asset has been waiting in the queue since its arrival. By multiplying the aging factor with the data change measure, a fair share of priority is given to each asset. This combination of the aging factor and the data change measure provides a mechanism to resolve ties and ensure equitable handling of backup assets. For this embodiment, system 400 can be extended to include further conflict resolver 401 components using these other attributes in the event of continuing conflicts among the tagged assets 410. This would ensure there is a further fair share of priority given along with the conflict resolution per asset on various different dimensions of attributes.

FIG. 6 is a flowchart illustrating a method of resolving conflicts among identically tagged assets, under some embodiments. The data asset may be any appropriate data elements, such as a virtual machine, filesystem, database, document, and so on. For purposes of illustration, FIG. 6 is described in relation to a virtual machine backup using data protection software, but any other type of data asset may be used.

As shown in process FIG. 6, process 600 starts by receiving a number of VM assets for data protection (e.g., backup or restore) processing. All of the VMs are presumed to be tagged with identical priority tags based on their criticality, 602.

The data protection software tracks and analyzes the changes made to each VM since the last backup to derive a data change measure for each VM, 604. This can be achieved by monitoring VM attributes such as file modifications, block-level changes, metadata updates, or incremental backups. The software calculates a data change measure for each virtual machine, quantifying the extent of modifications made.

Upon arrival of multiple VMs with the same priority for backup, the software records the arrival time of each VM, 606. This information is used to determine the aging factor of each VM representing the duration that each VM has been waiting in the queue, and which may be used as an additional factor if needed, such as if data change rates are identical among some VMs.

The process then resolves conflicts 608 among the queued VMs by first analyzing the data change measure to set the schedule or to re-prioritize VMs within a set schedule in accordance with their relative data change measures. The aging factor may be used to further modify the priority order of equal change rate VMs. The step may involve assigning a score to each virtual machine, considering its data change measure and the time it has spent in the queue, and the score then reflects the relative priority of the VM in the workflow queue 503.

The conflict resolution step is then used by a VM queue management process that maintains a VM backup queue, which includes the equal-priority VMs awaiting backup. The conflict resolver processes this queue, and applies the scores to establish the order in which the VMs are processed. Virtual machines with higher scores are given higher priority and processed ahead of others with the same priority tag.

In an embodiment, a graphical user interface (GUI) component may be provided as part of the data protection software user interface to give a clear visualization of the virtual machine backup queue, such as shown in FIG. 5. This would display the prioritization of the VMs or other assets based on the combined factors of data change measure and aging factor. This GUI thus allows administrators or users to easily understand the rationale behind the order in which the assets are being processed.

Although process 600 is illustrated for the case where a data change rate and aging factor are used for the prioritization and re-prioritization of data assets, embodiments are not so limited. Any appropriate attribute besides data change rate may be used to resolve a scheduling conflict among identically tagged assets. Likewise, any other factor instead of aging may be used to further re-prioritize the assets if there is a tie in the first attribute.

By implementing the conflict resolver during equal priority VM processing, the data protection software ensures that VMs with more significant data changes or longer waiting times are given higher priority during backup operations. This approach minimizes priority conflicts, improves the accuracy of decision-making, and thus optimizes the backup process.

In an embodiment, certain supervised learning methods can be used to generate or use models (e.g., 308, 408) for classifiers 304 or estimators 404. As used herein, "supervised learning" refers to a subcategory of machine learning (ML) and artificial intelligence (AI) that is defined by the use of labeled datasets to train algorithms that to classify data or predict or estimate outcomes accurately. In an embodiment, the KNN process is used for the data classification to classify current and new data objects with respect to criticality and backup/restore prioritization within an overall data protection process.

In an embodiment, the classifier and tagger component 301 utilizes certain artificial intelligence (AI) and machine learning (ML) processes to evaluate new data objects using various attributes, such as data change size, data change rate, bit map count, bit map size etc., to generate the model 308. Such a process generally uses a training component that continuously trains a machine learning algorithm.

FIG. 7 illustrates a general AI/ML component used in a backup scheduler processing component, under some embodiments. System 700 of FIG. 7 includes a data collection component 702, a training component 704, and an inference component 706. The data collection component 702 can comprise various data loggers and I/O capture devices and databases 711 along with a body of historical information 715 about past data objects, clients, and events (e.g., backup operations). The data collection component 702 continuously monitors and collects data objects and event data to build up its database. This collected information is submitted to the training component 704 through an AI-based analyzer 717. This component continuously trains a machine learning algorithm to identify the data object attributes to thereby determine a cloning method for the new data object and/or client. The inference engine 706 also continuously trains the AI/ML algorithms through monitored events.

The AI component of system 700 may employ any suitable AI algorithm, such as a fitting algorithm to derive the data change metric. In general, the performance required to handle the vast variation of data source types and huge size of the big data involved, which may be in zeta bytes of range, may be achieved with low latency and high throughput through embodiments described herein. Such AI mechanisms may be scaled and modified for different application needs and system configurations.

Figure 8:
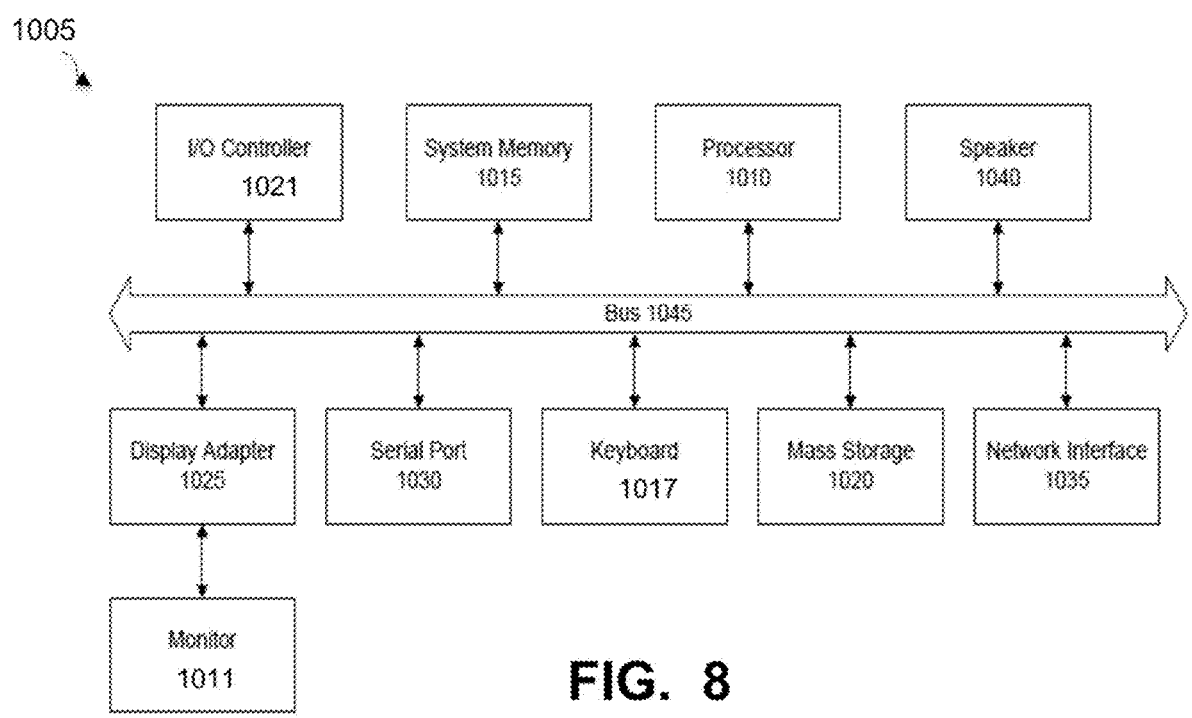
FIG. 8 shows a system block diagram of a computer system used to execute one or more software components of the present system described herein.

The system of FIG. 1 may comprise any number of computers or computing devices in client-server networks including virtual machines coupled over the Internet or similar large-scale network or portion thereof. Each processing device in the network may comprise a computing device capable of executing software code to perform the processing steps described herein. FIG. 8 is a system block diagram of a computer system used to execute one or more software components of the present system described herein. The computer system 1005 includes a monitor 1011, keyboard 1017, and mass storage devices 1020. Computer system 1005 further includes subsystems such as central processor 1010, system memory 1015, input/output (I/O) controller 1021, display adapter 1025, serial or universal serial bus (USB) port 1030, network interface 1035, and speaker 1040. The system may also be used with computer systems with additional or fewer subsystems. For example, a computer system could include more than one processor 1010 (i.e., a multiprocessor system) or a system may include a cache memory.

Arrows such as 1045 represent the system bus architecture of computer system 1005. However, these arrows are illustrative of any interconnection scheme serving to link the subsystems. For example, speaker 1040 could be connected to the other subsystems through a port or have an internal direct connection to central processor 1010. The processor may include multiple processors or a multicore processor, which may permit parallel processing of information. Computer system 1005 is but an example of a computer system suitable for use with the present system. Other configurations of subsystems suitable for use with the present invention will be readily apparent to one of ordinary skill in the art.

Computer software products may be written in any of various suitable programming languages. The computer software product may be an independent application with data input and data display modules. Alternatively, the computer software products may be classes that may be instantiated as distributed objects. The computer software products may also be component software.

An operating system for the system may be one of the Microsoft Windows®. family of systems (e.g., Windows Server), Linux, Mac OS X, IRIX32, or IRIX64. Other operating systems may be used.

Furthermore, the computer may be connected to a network and may interface to other computers using this network. The network may be an intranet, internet, or the Internet. The network may be a wired network (e.g., using copper), telephone network, packet network, an optical network (e.g., using optical fiber), or a wireless network, or any combination of these. For example, data and other information may be passed between the computer and components (or steps) of a system of the invention using a wireless network using a protocol such as Wi-Fi (IEEE standards 802.11x), near field communication (NFC), radio-frequency identification (RFID), mobile or cellular wireless. For example, signals from a computer may be transferred, at least in part, wirelessly to components or other computers.

For the sake of clarity, the processes and methods herein have been illustrated with a specific flow, but it should be understood that other sequences may be possible and that some may be performed in parallel, without departing from the spirit of the invention. Additionally, steps may be subdivided or combined. As disclosed herein, software written in accordance with the present invention may be stored in some form of computer-readable medium, such as memory or CD-ROM, or transmitted over a network, and executed by a processor. More than one computer may be used, such as by using multiple computers in a parallel or load-sharing arrangement or distributing tasks across multiple computers such that, as a whole, they perform the functions of the components identified herein; i.e. they take the place of a single computer. Various functions described above may be performed by a single process or groups of processes, on a single computer or distributed over several computers. Processes may invoke other processes to handle certain tasks. A single storage device may be used, or several may be used to take the place of a single storage device.

For the sake of clarity, the processes and methods herein have been illustrated with a specific flow, but it should be understood that other sequences may be possible and that some may be performed in parallel, without departing from the spirit of the invention. Additionally, steps may be subdivided or combined. As disclosed herein, software written in accordance with the present invention may be stored in some form of computer-readable medium, such as memory or CD-ROM, or transmitted over a network, and executed by a processor. More than one computer may be used, such as by using multiple computers in a parallel or load-sharing arrangement or distributing tasks across multiple computers such that, as a whole, they perform the functions of the components identified herein; i.e., they take the place of a single computer. Various functions described above may be performed by a single process or groups of processes, on a single computer or distributed over several computers. Processes may invoke other processes to handle certain tasks. A single storage device may be used, or several may be used to take the place of a single storage device.

Unless the context clearly requires otherwise, throughout the description and the claims, the words "comprise," "comprising," and the like are to be construed in an inclusive sense as opposed to an exclusive or exhaustive sense; that is to say, in a sense of "including, but not limited to." Words using the singular or plural number also include the plural or singular number respectively. Additionally, the words "herein," "hereunder," "above," "below," and words of similar import refer to this application as a whole and not to any particular portions of this application. When the word "or" is used in reference to a list of two or more items, that word covers all of the following interpretations of the word: any of the items in the list, all of the items in the list and any combination of the items in the list.

All references cited herein are intended to be incorporated by reference. While one or more implementations have been described by way of example and in terms of the specific embodiments, it is to be understood that one or more implementations are not limited to the disclosed embodiments. To the contrary, it is intended to cover various modifications and similar arrangements as would be apparent to those skilled in the art. Therefore, the scope of the appended claims should be accorded the broadest interpretation so as to encompass all such modifications and similar arrangements.

What is claimed is:

1. A computer-implemented method of prioritizing assets for processing in a data protection system, the method comprising:
    receiving a plurality of assets organized in a queue to be processed by an operation of the data protection system, wherein each asset is tagged with an identical prioritization tag;
    determining a data change rate of the each asset, as expressed as a number of bytes changed per unit of time, wherein the data change rate is estimated for the asset using a classifier implementing an artificial intelligence (AI) or machine learning (ML) based supervised learning process;
    re-scheduling an order of the queue by prioritizing processing of an asset with a higher data change rate relative to other assets in the queue; and
    performing a backup operation of the plurality of assets by a backup server according to the queue.

2. The method of claim 1 further comprising recording an arrival time of each data asset in the queue to derive an aging factor for each respective asset.

3. The method of claim 2 further comprising further re-scheduling the order of the queue by re-prioritizing an asset with a longer aging factor as compared to another asset with a same data change rate.

4. The method of claim 3 further comprising assigning a scheduling score to each asset based on its respective data change rate to set a prioritization of the asset in the queue relative to the other assets.

5. The method of claim 4 further comprising modifying the scheduling score of an asset based on its respective aging factor to generate a final score for the asset.

6. The method of claim 3 wherein the order of the queue is re-scheduled by one of: re-prioritizing a higher data change rate asset ahead of another asset in the queue, or re-prioritizing a lower data change rate behind another asset in the queue.

7. The method of claim 1 further comprising training a model using historical data of data protection operations to establish past data change metrics for past assets processed in the system.

8. The method of claim 1 wherein the prioritization tag represents a criticality of the asset as compared to a respective criticality of the other assets.

9. The method of claim 8 wherein the criticality of the asset is determined using a classifier implementing an artificial intelligence (AI) or machine learning (ML) based supervised learning process.

10. The method of claim 9 further comprising training a model using historical data of data protection operations to establish a relative criticality for past assets processed in the system.

11. The method of claim 1 wherein the asset comprises at least one of a file, a filesystem, a directory, a virtual machine (VM), or a data object, and wherein the system comprises a PowerProtect Data Domain deduplication backup system.

12. A system for prioritizing assets for processing in a data protection system, comprising:
   an interface receiving a plurality of assets organized in a queue to be processed by an operation of the data protection system, wherein each asset is tagged with an identical prioritization tag;
   a processor based data change rate component determining a data change rate of the each asset, as expressed as a number of bytes changed per unit of time, wherein the data change rate is estimated for the asset using a classifier implementing an artificial intelligence (AI) or machine learning (ML) based supervised learning process; and
   a processor based scheduler component re-scheduling an order of the queue by prioritizing processing of an asset with a higher data change rate relative to other assets in the queue;
   a backup server executing a backup operation on the plurality of assets according to the queue.

13. The system of claim 12 further comprising the interface recording an arrival time of each data asset in the queue to derive an aging factor for each respective asset.

14. The system of claim 13 further comprising the scheduler further re-scheduling the order of the queue by re-prioritizing an asset with a longer aging factor as compared to another asset with a same data change rate.

15. The system of claim 14 further comprising a scoring component assigning a scheduling score to each asset based on its respective data change rate to set a prioritization of the asset in the queue relative to the other assets.

16. The system of claim 15 further comprising the scheduler modifying the scheduling score of an asset based on its respective aging factor to generate a final score for the asset.

17. The system of claim 16 wherein the order of the queue is re-scheduled by one of: re-prioritizing a higher data change rate asset ahead of another asset in the queue, or re-prioritizing a lower data change rate behind another asset in the queue.

18. The system of claim 12 wherein the asset comprises at least one of a file, a filesystem, a directory, a virtual machine (VM), or a data object, and wherein the data protection system comprises a PowerProtect Data Domain deduplication backup system.

19. A tangible computer program product comprising a non-transitory computer-readable medium having a computer-readable program code embodied therein, the computer-readable program code adapted to be executed by one or more processors to implement a method of prioritizing assets for processing in a data protection system, the method comprising:
   receiving a plurality of assets organized in a queue to be processed by an operation of the data protection system, wherein each asset is tagged with an identical prioritization tag;
   determining a data change rate of the each asset, as expressed as a number of bytes changed per unit of time, wherein the data change rate is estimated for the asset using a classifier implementing an artificial intelligence (AI) or machine learning (ML) based supervised learning process; and
   re-scheduling an order of the queue by prioritizing processing of an asset with a higher data change rate relative to other assets in the queue;
   performing a backup operation of the plurality of assets by a backup server according to the queue.

* * * * *